(12) United States Patent
Jenne et al.

(10) Patent No.: US 11,592,891 B2
(45) Date of Patent: Feb. 28, 2023

(54) SYSTEM AND METHOD FOR DIAGNOSING RESISTIVE SHORTS IN AN INFORMATION HANDLING SYSTEM

(71) Applicant: DELL PRODUCTS, LP, Round Rock, TX (US)

(72) Inventors: John Erven Jenne, Austin, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 16/653,232

(22) Filed: Oct. 15, 2019

(65) Prior Publication Data

US 2021/0109586 A1    Apr. 15, 2021

(51) Int. Cl.
*G06F 1/3234* (2019.01)
*G06F 1/16* (2006.01)

(52) U.S. Cl.
CPC .......... *G06F 1/3253* (2013.01); *G06F 1/1616* (2013.01)

(58) Field of Classification Search
CPC . G05F 3/02; G06F 1/26; G06F 1/3203; G06F 1/28; G06F 1/3206; G06F 1/3243; G06F 1/3262; G06F 2119/06
USPC .................................. 713/300, 340; 320/134
See application file for complete search history.

(56) References Cited

U.S. PATENT DOCUMENTS

| | | | |
|---|---|---|---|
| 4,093,847 A * | 6/1978 | Walker | F24H 9/2028 392/318 |
| 9,185,241 B2 * | 11/2015 | Valobra | G06F 30/367 |
| 9,645,560 B2 * | 5/2017 | Nakayama | H02J 13/00034 |
| 9,678,137 B2 | 6/2017 | Mutnury et al. | |
| 11,001,150 B2 * | 5/2021 | Hidaka | B60L 58/22 |
| 2002/0005713 A1 * | 1/2002 | Klofer | G08C 19/02 324/103 P |
| 2003/0189811 A1 * | 10/2003 | Peeke | G11B 33/125 361/679.32 |
| 2006/0080559 A1 * | 4/2006 | Sauber | G06F 1/324 713/300 |
| 2006/0186113 A1 * | 8/2006 | Daniels | H05B 3/56 219/549 |
| 2007/0050650 A1 * | 3/2007 | Conroy | G06F 1/26 713/300 |
| 2007/0234081 A1 * | 10/2007 | Makino | G06F 1/187 713/300 |
| 2010/0244757 A1 * | 9/2010 | Tsai | H02P 29/032 318/434 |
| 2012/0016528 A1 * | 1/2012 | Raman | G06F 9/5094 700/291 |
| 2012/0133333 A1 * | 5/2012 | Morioka | H01M 10/441 320/134 |
| 2012/0185838 A1 * | 7/2012 | Schwartzman | G06F 8/66 717/168 |
| 2013/0031385 A1 * | 1/2013 | Seto | G06F 1/28 713/300 |

(Continued)

*Primary Examiner* — Faisal M Zaman
(74) *Attorney, Agent, or Firm* — Larson Newman, LLP

(57) ABSTRACT

An information handling system includes resistive short detection circuitry that measures a first amount of power provided by a power supply system, and measures a second amount of power drawn by components. The resistive short detection circuitry compares the first amount of power with the second amount of power. In response to first amount of power being greater than the second amount of power, the resistive short detection circuitry determines that a short exists within the information handling system.

18 Claims, 6 Drawing Sheets

(56) References Cited

U.S. PATENT DOCUMENTS

| | | | | |
|---|---|---|---|---|
| 2013/0033788 A1* | 2/2013 | Legaspi | ............... | H02H 9/08 |
| | | | | 361/42 |
| 2014/0208139 A1* | 7/2014 | Hatamori | ............... | G06F 1/30 |
| | | | | 713/320 |
| 2014/0375333 A1* | 12/2014 | Minagawa | ............. | G01R 17/02 |
| | | | | 324/537 |
| 2015/0115716 A1* | 4/2015 | Vesper | ............... | G01R 21/00 |
| | | | | 307/31 |
| 2015/0312095 A1* | 10/2015 | Suzuki | ............... | G06F 30/34 |
| | | | | 715/735 |
| 2016/0164511 A1* | 6/2016 | Strutt | ............... | H03K 17/74 |
| | | | | 327/434 |
| 2016/0232949 A1 | 8/2016 | Petivan, III et al. | | |
| 2016/0268648 A1* | 9/2016 | Ueno | ............... | H01M 10/0525 |
| 2016/0292105 A1* | 10/2016 | Imahori | ............... | F25D 29/00 |
| 2017/0018923 A1* | 1/2017 | Rombouts | ............. | G05B 17/02 |
| 2017/0350271 A1* | 12/2017 | Ewens | ............... | G05B 13/041 |
| 2020/0110381 A1* | 4/2020 | Humphrey | ......... | H02J 13/0017 |
| 2022/0233577 A1* | 7/2022 | Gibson | ............... | A61K 47/10 |

* cited by examiner

SYSTEM AND METHOD FOR DIAGNOSING RESISTIVE SHORTS IN AN INFORMATION HANDLING SYSTEM

FIELD OF THE DISCLOSURE

The present disclosure generally relates to information handling systems, and more particularly relates to a system to diagnose resistive shorts in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes resistive short detection circuitry that may measure a first amount of power provided by a power supply system, and measure a second amount of power drawn by components. If the first amount of power is greater than the second amount of power, the resistive short detection circuitry may determine that a short exists within the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
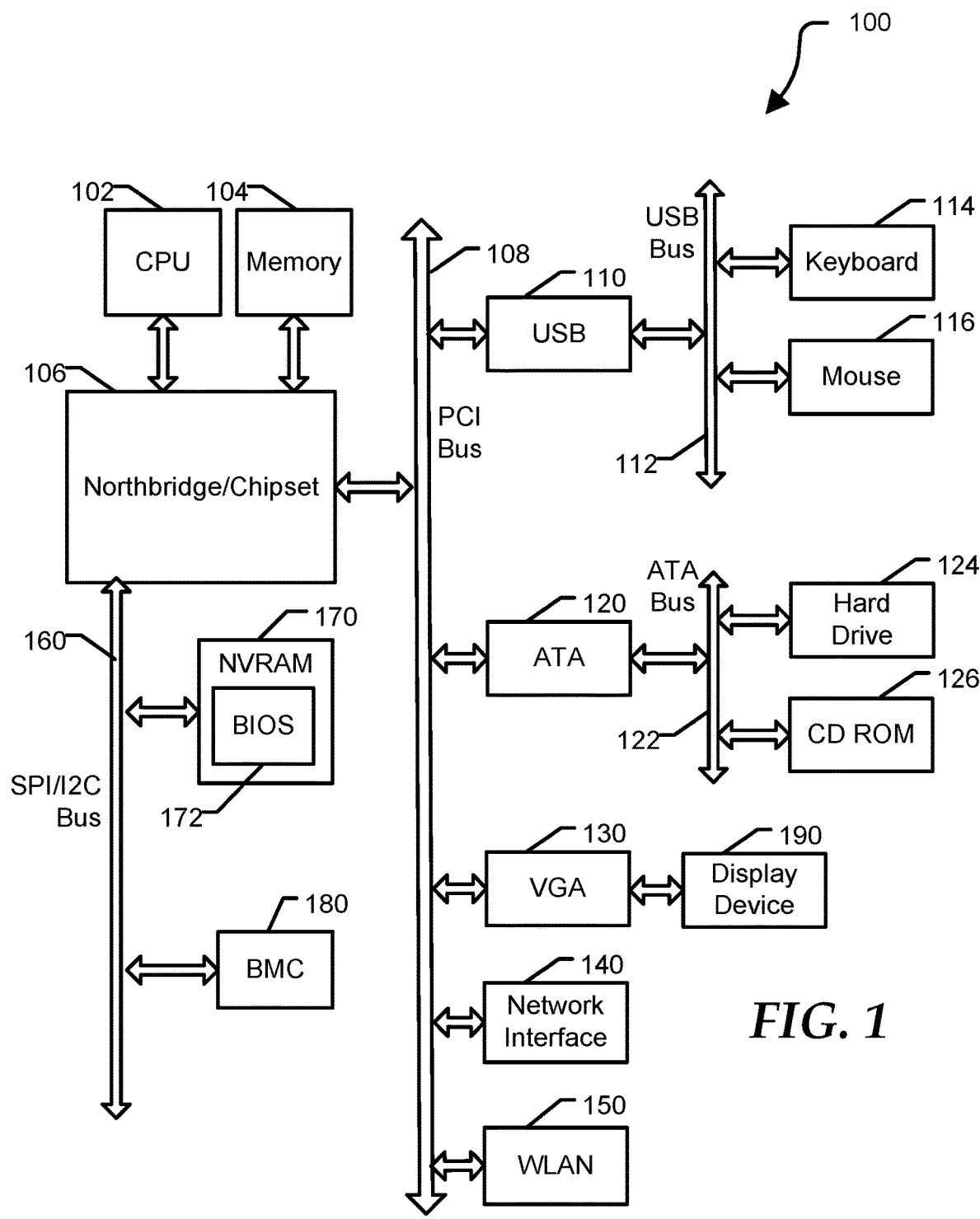
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skill in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
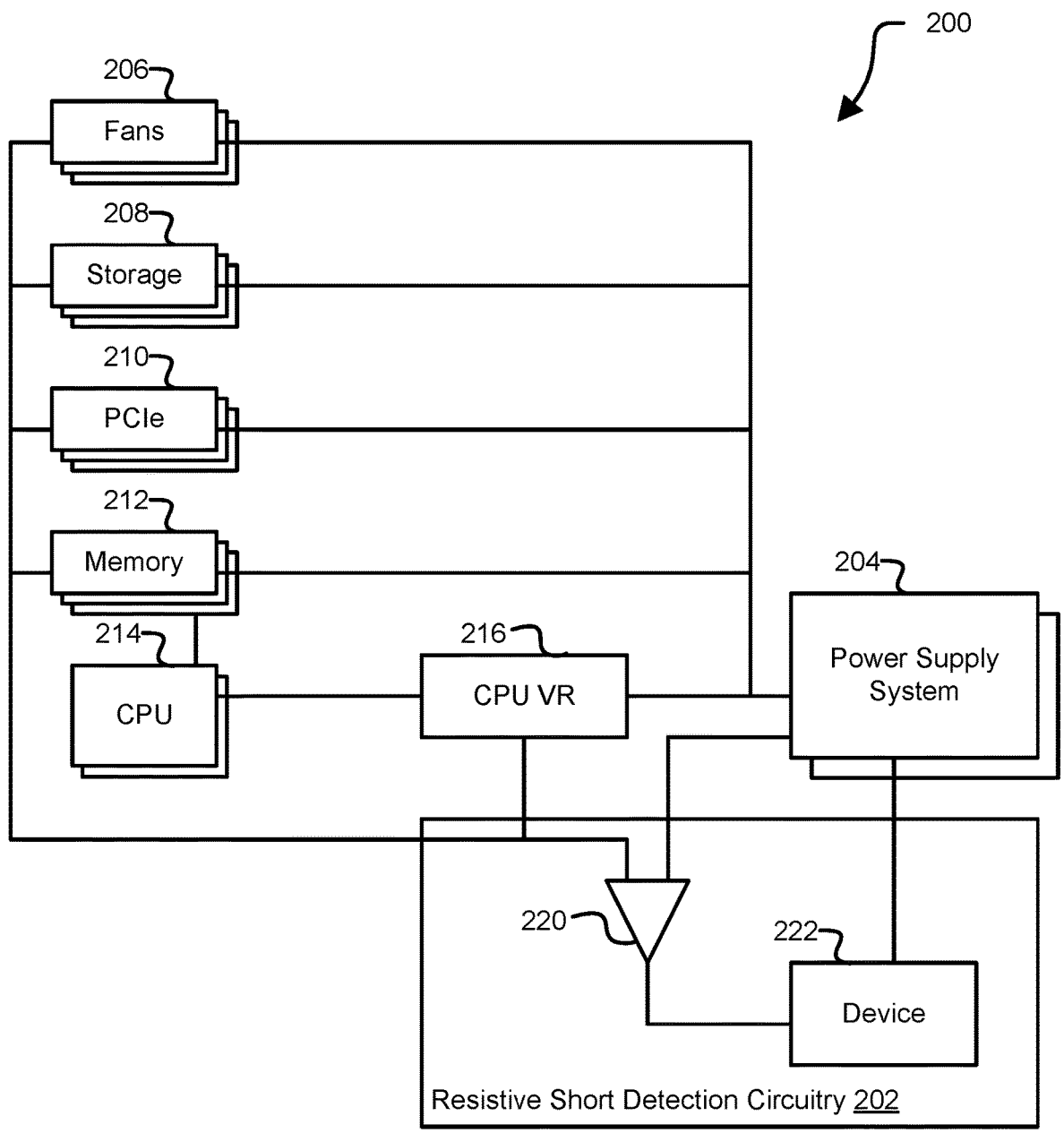
FIG. 2 is a block diagram of a portion of an information handling system for resistive short detection according to at least one embodiment of the disclosure.
Figure 3:
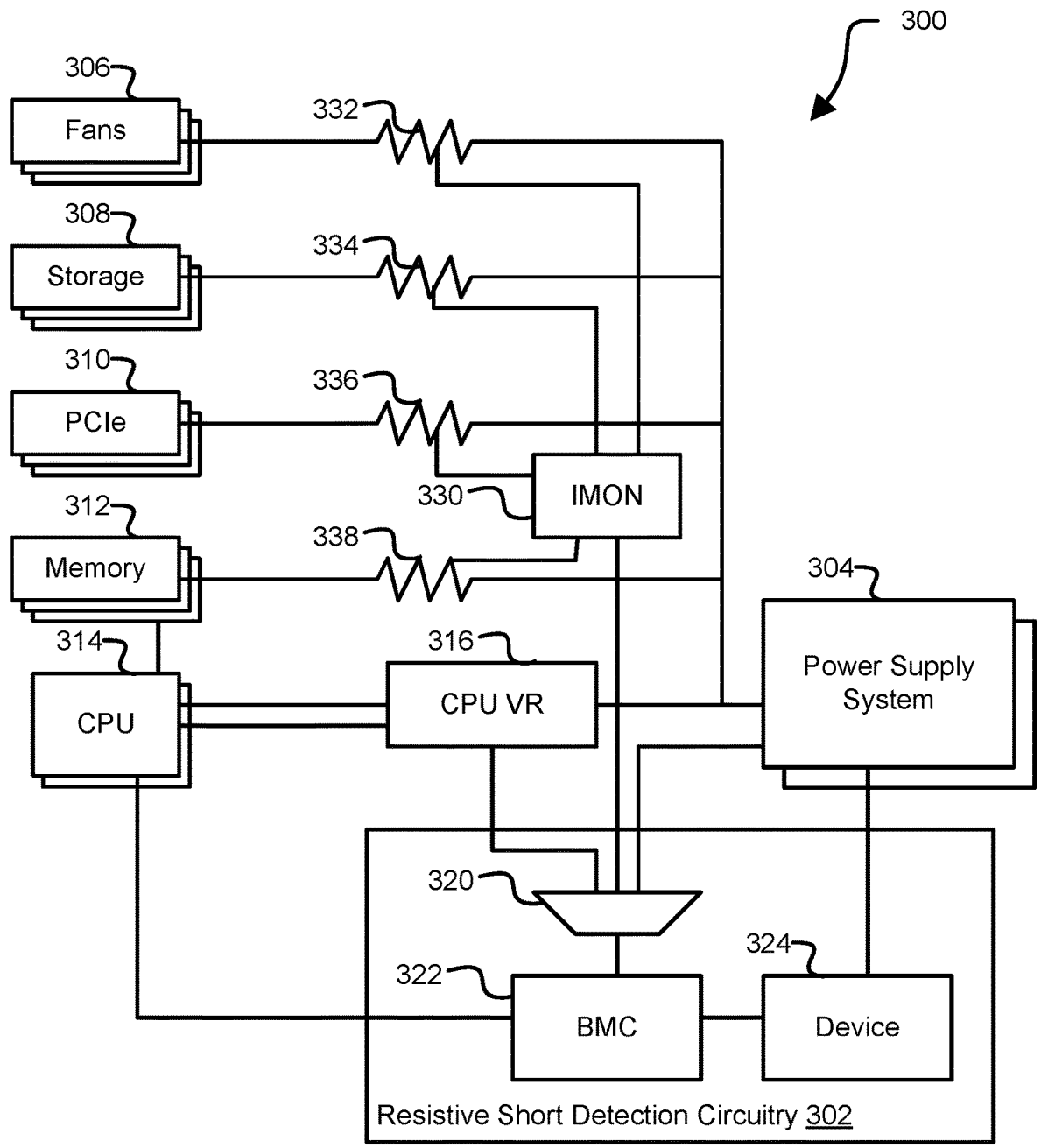
FIG. 3 is a block diagram of another embodiment of a portion of an information handling system for resistive short detection according to at least one embodiment of the disclosure.

FIG. 2 is a block diagram of a portion of an information handling system 200 for detection of a resistive short within the information handling system according to at least one embodiment of the disclosure. Information handling system 200 includes resistive short detection circuitry 202, a power supply system 204, and a plurality of components including, but not limited to, one or more fans 206, one or more storage devices 208, one or more PCIe devices 210, one or more memories 212, one or more CPUs 214, and a CPU VR 216. Resistive short detection circuitry 202 includes any suitable components or devices to perform the operations of the resistive short detection circuitry as described herein. For example, resistive short detection circuitry 202 may include a comparator 220 and a device 222 as shown in FIG. 2. In another example, resistive short detection circuitry 302 may include a digital interface multiplexor 320, a BMC 322, and a device 324 as shown in FIG. 3.

Information handling system 200 may be employed, in whole or in part, by information handling system 100 illustrated in FIG. 1, or any other system, device, component, etc. operable to employ portions, or all of, the information handling system. In an example, device 222 may be any suitable type of device including, but not limited to, a complex programmable logic device (CPLD). In certain examples, power supply system 204 may include any suitable device or devices to provide power to components 206, 208, 210, 212, and 214 within information handling system 200 including, but not limited to, multiple power supply units and a hot swap controller.

During operation, power supply system 204 may provide power to components 206, 208, 210, 212, 214, and 216. However, in certain circumstances not all of the power provided to components 206, 208, 210, 212, 214, and 216 may reach the components. In an example, resistive shorts may exist within information handling system 200, and the resistive shorts may continue within information handling system 200 for long periods of time. In this situation, the resistive shorts may lead to hardware damage and possibly smoke or fire within information handling system 200. Therefore, resistive short detection circuitry 202 may be needed to monitor different amounts of power within information handling system 200, and to detect possible resistive shorts within the information handling system. In an example, the amounts of power monitored may include, but are not limited to, the amount of power provided by power supply system 204 and the amount of power consumed by components 206, 208, 210, 212, 214, and 216.

Prior to monitoring the amounts of power within information handling system 200, device 222 of resistive short detection circuitry 202 may monitor for a signal from power supply system 204. In an example, the signal may be a power supply on signal. In an embodiment, the power supply on signal indicates that power supply system 204 is providing power to components 206, 208, 210, 212, 214, and 216. In response to detecting the power supply on signal, resistive short detection circuitry 202 may monitor the amount of power provided by power supply system 204 and the amounts of power consumed by components 206, 208, 210, 212, 214, and 216.

In an example, power supply system 204 may provide an analog signal representing the amount of power provided by the power supply system to components 206, 208, 210, 212, 214, and 216. In certain examples, the signal may represent an aggregate amount of power provided from multiple power supply systems. Comparator 202 of resistive short detection circuitry 202 may receive, at a first input terminal, the analog signal representing the amount of power provided by power supply system 204.

In some examples, the amounts of power consumed by components 206, 208, 210, 212, 214, and 216 may be monitored in any suitable manner by any suitable device. For example, each of components 206, 208, 210, and 212 may include one or more devices to measure power the consumed within the particular component. In an example, the devices within components 206, 208, 210, and 212 may provide analog signals representative of an amount of power consumed within the respective component. In addition, CPU VR 216 may provide an analog signal representative of the power consumed by CPU 214. In an example, a signal indicating the amount of power consumed by one of components 206, 208, 210, 212, 214, and 216 may be representative of an aggregate amount of power consumed by each similar component. For example, a signal provided for an amount of power consumed by fan 206 may be representative of the amount of power consumed by multiple fans within information handling system 200. Similar to CPU VR 216, the aggregate power of similar components may also be provided by an analog signal from a VR that supplies power to a given group of similar components.

Comparator 202 of resistive short detection circuitry 202 may receive, at a second input terminal, the aggregate analog signal representing the amount of power consumed by components 206, 208, 210, 212, 214, and 216. Comparator 202 may compare the signals received at the first and second input terminals, and output, from an output terminal, a signal representative of whether the amount of power provided by power supply system 204 exceeds the amount of power consumed by components 206, 208, 210, 212, 214, and 216. In an example, resistive short detection circuitry 202 may include any suitable amount of a margin of difference between the amount of power provided by power supply system 204 and the amount of power consumed by components 206, 208, 210, 212, 214, and 216 when the comparison is made by comparator 202. In this example, the margin of difference may account for loads that cannot be monitored, sensed accurately, or the like.

Device 222 may receive the output signal representing whether the amount of power provided by power supply system 204 exceeds the amount of power consumed by components 206, 208, 210, 212, 214, and 216. If device 222 determines, based on the signal from comparator 220, that the amount of power provided by power supply system 204 exceeds the amount of power consumed by components 206, 208, 210, 212, 214, and 216, the device may detect that a resistive short exists within information handling system 200. In response to detecting the resistive short, device 222 may trigger a shutdown of information handling system 200. Thus, resistive short detection circuitry 202 may improve information handling system 200 by detecting resistive shorts within the information handling system and powering down the information handling system before there is damage to components 206, 208, 210, 212, 214, and 216.

FIG. 3 is a block diagram of a portion of an information handling system 300 for detection of a resistive short within the information handling system according to at least one embodiment of the disclosure. Information handling system 300 includes resistive short detection circuitry 302, a power supply system 304, and a plurality of components including, but not limited to, one or more fans 306, one or more storage devices 308, one or more PCIe devices 310, one or more memories 312, one or more CPUs 314, and a CPU VR 316. Resistive short detection circuitry 302 includes any suitable components or devices to perform the operations of the resistive short detection circuitry as described herein. Resistive short detection circuitry 302 includes a digital interface multiplexor 320, a BMC 322, and a device 324. Information handling system 300 further includes a current monitor (IMON) 330 and resistors 332, 334, 336, and 338.

Information handling system 300 may be employed, in whole or in part, by information handling system 100 illustrated in FIG. 1, or any other system, device, component, etc. operable to employ portions, or all of, the information handling system. In an example, device 324 may be any suitable type of device including, but not limited to, a complex programmable logic device (CPLD). In certain examples, power supply system 304 may include any suitable device or devices to provide power to the components within information handling system 300 including, but not limited to, multiple power supply units and a hot swap controller. In an example, BMC 322 may be any suitable type of controller, such as a BMC in accordance with an IPMI specification, an Integrated Dell Remote Access Controller (iDRAC), or the like. In certain examples, IMON 330 may provide digital signals to digital interface multiplexor 320 via any suitable digital interface including, but not limited to, an I$^2$C interface.

As described above with respect to FIG. 2, power supply system 304 may provide power to components 306, 308, 310, 312, 314, and 316. However, in certain circumstances not all of the power provided to components 306, 308, 310, 312, 314, and 316 may reach the components. In an example, resistive shorts may exist within information handling system 300, and the resistive shorts may continue within information handling system 300 for long periods of time. In this situation, the resistive shorts may lead to hardware damage and possibly smoke or fire within information handling system 300. Thus, resistive short detection circuitry 302 may monitor different amounts of power within information handling system 300 to detect possible resistive shorts within the information handling system. In an example, the amounts of power monitored may include, but are not limited to, the amount of power provided by power supply system 304 and the amount of power consumed by components 306, 308, 310, 312, 314, and 316.

Device 324 of resistive short detection circuitry 302 may monitor power supply system 304 for the power supply on signal from the power supply system. In response to detecting the power supply on signal, resistive short detection circuitry 302 may monitor digital power telemetry from power supply system 304 and components 306, 308, 310, 312, 314, and 316 to determine whether a resistive short exists within information handling system 300.

In an example, IMON 330 may measure the current flowing through resistors 332, 334, 336, and 338 to determine power provided to fans 306, storage devices 208, PCIe devices 310, and memory devices 312. Additionally, CPU VR 316 may measure power consumed by CPU 314. Thus, IMON 330 and CPU VR 316 may determine an amount of power consumed by components 306, 308, 310, 312, and 314. In certain examples, CPU VR 316 may provide a digital signal representative of the amount of power consumed by CPU 314 to a first terminal of digital interface multiplexor 320. Similarly, IMON 330 may provide a digital telemetry signal representative of the amount of power consumed by fans 206, storage devices 308, PCIe devices 310, and memory devices 312 to a second terminal of digital interface multiplexor 320.

Digital interface multiplexor 320 may provide the digital signals representing the amount power consumed by components 306, 308, 310, 312, and 314 and the amount of power provided by power supply system 304 to BMC 322. BMC 322 may aggregate the amount power consumed by components 306, 308, 310, 312, and 314 and compare this amount of power to the amount of power provided by power supply system 304. Based on this comparison, BMC 322 may output, from an output terminal, a signal representative of whether the amount of power provided by power supply system 304 exceeds the amount of power consumed by components 306, 308, 310, 312, and 314. In an example, resistive short detection circuitry 302 may include any suitable amount of a margin of difference between the amount of power provided by power supply system 304 and the amount of power consumed by components 306, 308, 310, 312, and 314 when the comparison is made by digital interface multiplexor 320. In this example, the margin of difference may account for loads that cannot be monitored, sensed accurately, or the like.

Device 324 may receive the output digital signal representing whether the amount of power provided by power supply system 304 exceeds the amount of power consumed by components 306, 308, 310, 312, and 314. If device 324 determines, based on the digital signal from BMC 322, that the amount of power provided by power supply system 304 exceeds the amount of power consumed by components 306, 308, 310, 312, and 314, the device may detect that one or more resistive shorts exist within information handling system 300. In response to detecting the resistive short, device 324 may trigger a shutdown of information handling system 300. Thus, resistive short detection circuitry 302 may improve information handling system 300 by detecting resistive shorts within the information handling system and powering down the information handling system before there is damage to components 306, 308, 310, 312, and 314.

Figure 4:
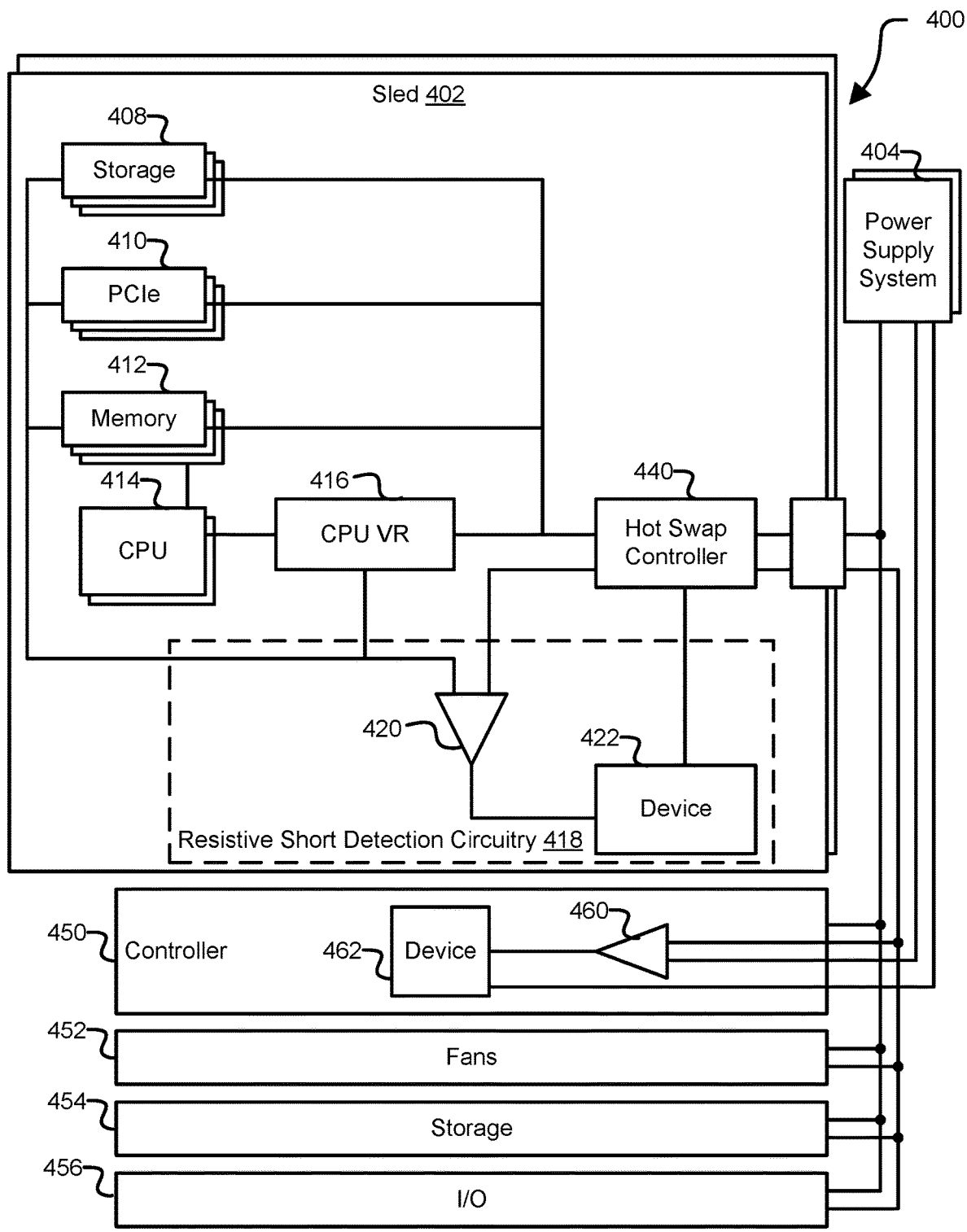
FIG. 4 is a block diagram of another embodiment of a portion of an information handling system for resistive short detection according to at least one embodiment of the disclosure.

FIG. 4 is a block diagram of a portion of an information handling system 400 for detection of a resistive short within the information handling system according to at least one embodiment of the disclosure. Information handling system 400 includes a sled 402 and a power supply system 404. In certain examples, information handling system 400 may be a modular chassis including one or more sleds that are substantially similar to sled 402. Sled 402 includes a plurality of components including, but not limited to, one or more storage devices 408, one or more PCIe devices 410, one or more memories 412, one or more CPUs 414, a CPU VR 416, resistive short detection circuitry 418 and a hot swap controller 440. Resistive short detection circuitry 418 includes any suitable components or devices to perform the operations of the resistive short detection circuitry including, but not limited to, a comparator 420 and a device 422. Information handling system 400 further includes a controller 450, fans 452, storage 454 and an input/output (I/O) module 456. Controller 450 includes a comparator 460 and a device 462. Controller 450 may be an embedded controller within a modular chassis system. Device 462 may be any suitable device including, but not limited to, a field programmable gate array (FPGA). In an embodiment, the resistive short detection circuitry 418 may include comparator 460 and device 462 without varying from the scope of the disclosure.

Information handling system 400 may be employed, in whole or in part, by information handling system 100 illustrated in FIG. 1, or any other system, device, component, etc. operable to employ portions, or all of, the information handling system. In an example, device 422 may be any suitable type of device including, but not limited to, a complex programmable logic device (CPLD). In certain examples, power supply system 404 may provide power to the components 408, 410, 412, and 414 within information handling system 400 via hot swap controller 440.

In certain circumstances not all of the power provided to components 408, 410, 412, and 414 may reach the components, such as when resistive shorts may exist within information handling system 400. Thus, resistive short detection circuitry 418 may monitor different amounts of power within sled 402 to determine whether possible resistive shorts exist within the sled. In an example, the amounts of power monitored may include, but are not limited to, the amount of power provided by hot swap controller 440 and the amount of power consumed by components 408, 410, 412, and 414.

In an example, device 462 may monitor amounts of power in one or more sleds. However, for clarity and brevity detection of resistive shorts will be described only with respect to sled 402. Prior to monitoring the amounts of power within information handling system 400, device 462 may monitor for a power supply on signal from power supply system 404. In response to detecting the power supply on signal, device 462 may monitor an output signal from comparator 460. In an example, the output signal from comparator 460 may indicate whether the amount of power provided by power supply system 404 is greater than the amount of power consumed by sled 402, fans 452, storage device 454 and I/O module 456.

In an example, power supply system 404 may provide an analog signal representing the amount of power provided by the power supply system 404 to sled 402, fans 452, storage device 454 and I/O module 456. In certain examples, the signal may represent an aggregate amount of power provided from multiple power supply systems. Comparator 460 may receive, at a first input terminal, the analog signal representing the amount of power provided by power supply system 404.

In some examples, amounts of power consumed by components 408, 410, 412, and 414 may be monitored in any suitable manner by any suitable device. For example, components 408, 410, 412, and 414, CPU VR 416, comparator 420, and device 422 may operate in a manner substantially similar to components 208, 210, 212, and 214, CPU VR 216, comparator 220, and device 222 of FIG. 2 to provide an analog signal representative of an amount of power consumed by components 408, 410, 412, and 414. In this example, device 422 may monitor for a resistive short within sled 402 based on the power signal from hot swap controller 440 and the power consumed by components 408, 410, 412, and 414, and the monitoring may be substantially similar to that described in FIG. 2.

In some examples, amounts of power consumed by sled 402, fans 452, storage device 454 and I/O module 456 may be monitored in any suitable manner by any suitable device. For example, sled 402, fans 452, storage device 454 and I/O module 456, comparator 460, and device 462 may operate in a manner substantially similar to components 208, 210, 212, and 214, CPU VR 216, comparator 220, and device 222 of FIG. 2 to provide an analog signal representative of an amount of power consumed by sled 402, fans 452, storage device 454 and I/O module 456.

Comparator 460 may receive, at a second input terminal, an aggregate analog signal representing the amount of power consumed by sled 402, fans 452, storage device 454 and I/O module 456. Comparator 460 may compare the input signals and may output, from an output terminal, a signal representative of whether the amount of power provided by power supply system 404 exceeds the amount of power consumed by sled 402, fans 452, storage device 454 and I/O module 456. In an example, comparator 460 or device 462 may include any suitable amount of a margin of difference between the amount of power provided by power supply system 404 and the amount of power consumed by sled 402, fans 452, storage device 454 and I/O module 456 when the comparison is made by comparator 460. In this example, the margin of difference may account for loads that cannot be monitored, sensed accurately, or the like.

Device 462 may receive the output signal representing whether the amount of power provided by power supply system 404 exceeds the amount of power consumed by sled 402, fans 452, storage device 454 and I/O module 456. If device 462 determines, based on the signal from comparator 460, that the amount of power provided by power supply system 404 exceeds the amount of power consumed by sled 402, fans 452, storage device 454 and I/O module 456, the device may detect that a resistive short exists within information handling system 400. In response to detecting the resistive short, device 462 may trigger a shutdown of information handling system 400. Thus, controller 450 may improve information handling system 400 by detecting resistive shorts within information handling system 400 and powering down the modular chassis before there is damage to sled 402, fans 452, storage device 454 and I/O module 456.

In another embodiment, resistive short detection circuitry 418 may provide a signal to controller 450 if a resistive short is detected within sled 402. In response to receiving the signal, controller 450 may trigger a shutdown of sled 402.

Figure 5:
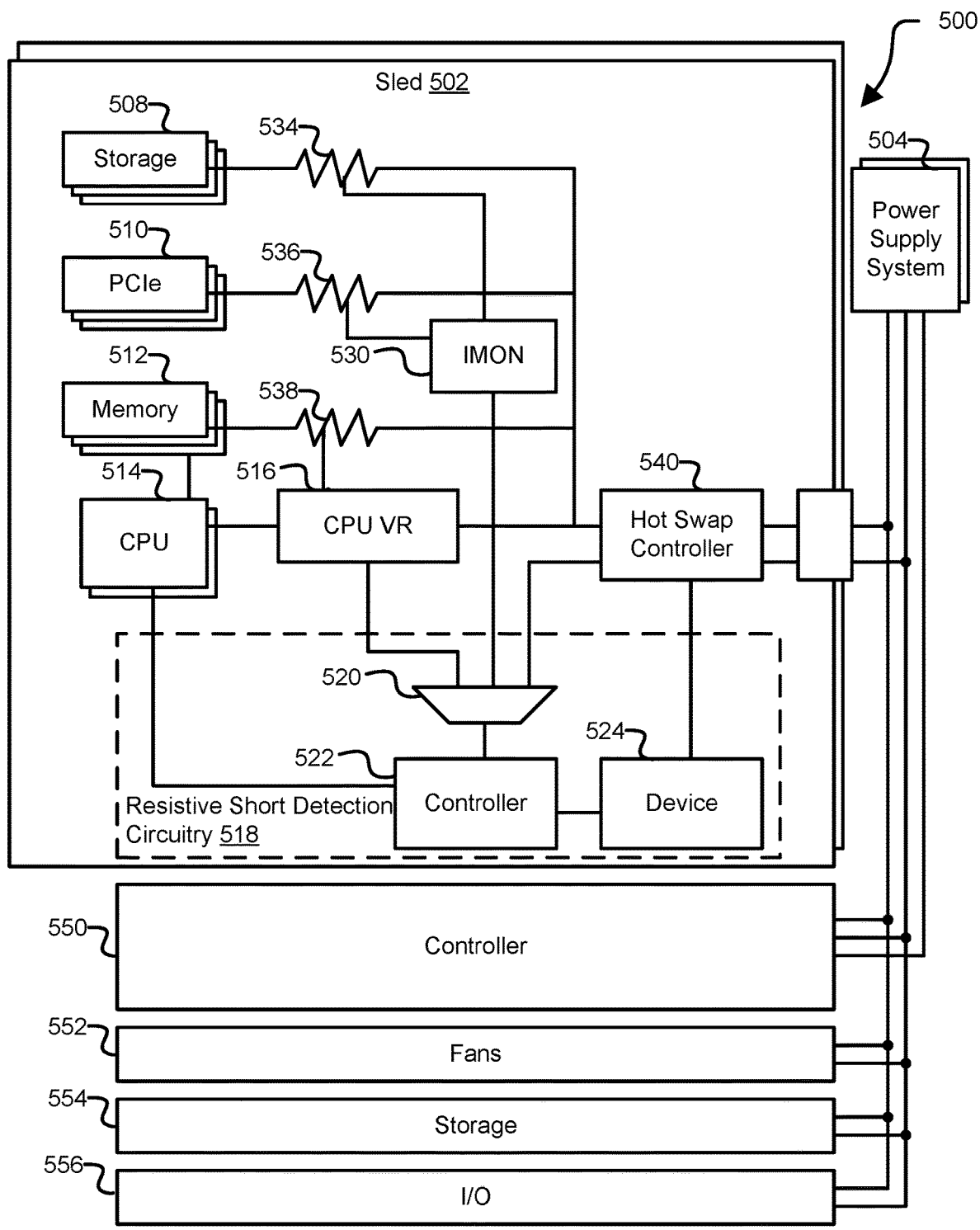
FIG. 5 is a block diagram of another embodiment of a portion of an information handling system for resistive short detection according to at least one embodiment of the disclosure.

FIG. 5 is a block diagram of a portion of an information handling system 500 for detection of a resistive short within the information handling system according to at least one embodiment of the disclosure. Information handling system 500 includes a sled 502, a power supply system 504. In certain examples, information handling system 500 may be a modular chassis including one or more sleds that are substantially similar to sled 502. Sled 502 includes a plurality of components including, but not limited to, one or more storage devices 508, one or more PCIe devices 510, one or more memories 512, one or more CPUs 514, a CPU VR 516, resistive short detection circuitry 518 and a hot swap controller 540. Resistive short detection circuitry 518 includes any suitable components or devices to perform the operations of the resistive short detection circuitry including, but not limited to, digital interface multiplexor 520, a controller 522, and a device 524. Information handling system 500 further includes a controller 550, fans 552, storage 554 and an I/O module 556. In an example, controller 550 may be an embedded controller within a modular chassis system. Sled 502 further includes an IMON 530 and resistors 534, 536, and 538. Information handling system 500 may be employed, in whole or in part, by information handling system 100 illustrated in FIG. 1, or any other system, device, component, etc. operable to employ portions, or all of, the information handling system. In certain examples, IMON 530 may provide digital signals to digital interface multiplexor 520 via any suitable digital interface including, but not limited to, an I$^2$C interface.

In certain circumstances not all of the power provided to components 508, 510, 512, and 514 may reach the components. For example, resistive shorts may exist within sled 502. Thus, controller 522 may monitor different amounts of power within sled 502 to detect whether possible resistive shorts exit within the sled. In an example, the amounts of power monitored may include, but are not limited to, the amount of power provided by hot swap controller 540 and the amount of power consumed by components 508, 510, 512, and 514. In this example, BMC 522 may monitor for a resistive short within sled 502 in a substantially similar manner to that described in FIG. 3.

In an example, controller 550 may monitor amounts of power in one or more chassis components. Prior to monitoring the amounts of power within information handling system 500, controller 550 may monitor for a power supply on signal from power supply system 504. In response to detecting the power supply on signal, controller 550 may monitor digital power telemetry from hot swap controller 540, fans 552, storage 554, I/O 556 and power supply system 504. In an example, resistive short detection logic in controller 550 may include any suitable amount of a margin of difference between the amount of power provided by power supply system 504 and the amount of power consumed by components 502, 552, 554, and 556 when the comparison is made by controller 550. In this example, the margin of difference may account for loads that cannot be monitored, sensed accurately, or the like.

In an example, power supply system 504 may provide digital telemetry representing the amount of power provided by the power supply system to components 502, 552, 554, and 556. In certain examples, the signal may represent an aggregate amount of power provided from multiple power supply systems.

In some examples, the amounts of power consumed by components 508, 510, 512, and 514 may be monitored in any suitable manner by any suitable device. For example, components 508, 510, 512, and 514, CPU VR 516, digital interface multiplexor 520, controller 522, device 524, and IMON 530 may operate in a manner substantially similar to components 308, 310, 312, and 314, CPU VR 316, digital interface multiplexor 320, controller 322, device 324, and IMON 330 of FIG. 3 to provide digital telemetry representative of an amount of power consumed by the components of sled 502.

In some examples, controller 550 may integrate multiplexing functions that allow it to collect digital telemetry from sled 502, fans 552, storage 554, and I/O 556. It may also integrate device functions that allow it to monitor status of hot swap controller 540 and power supply system 504. In other embodiments the multiplexing function and device function may be implemented using discrete subcomponents, similar to resistive short detection circuitry 518.

Controller 550 may compare the amount of power provided by power supply system 504 and the amount of power consumed by the components 502, 552, 554, and 556. Based on this comparison, controller 550 may determine whether the amount of power provided by power supply system 504 exceeds the amount of power consumed by components 502, 552, 554, and 556.

If controller 550 determines that the amount of power provided by power supply system 504 exceeds the amount of power consumed by components 502, 552, 554, and 556, the controller may detect that a resistive short exists within information handling system 500. In response to detecting the resistive short, controller 550 may trigger a shutdown of information handling system 500. Thus, controller 550 may improve information handling system 500 by detecting resistive shorts and powering down the information handling system before there is damage to components 502, 552, 554, and 556.

In another embodiment, resistive short detection circuitry 518 may provide a signal to controller 550 if a resistive short is detected within the sled. In response to receiving the signal, controller 550 may trigger a shutdown of sled 502.

Figure 6:
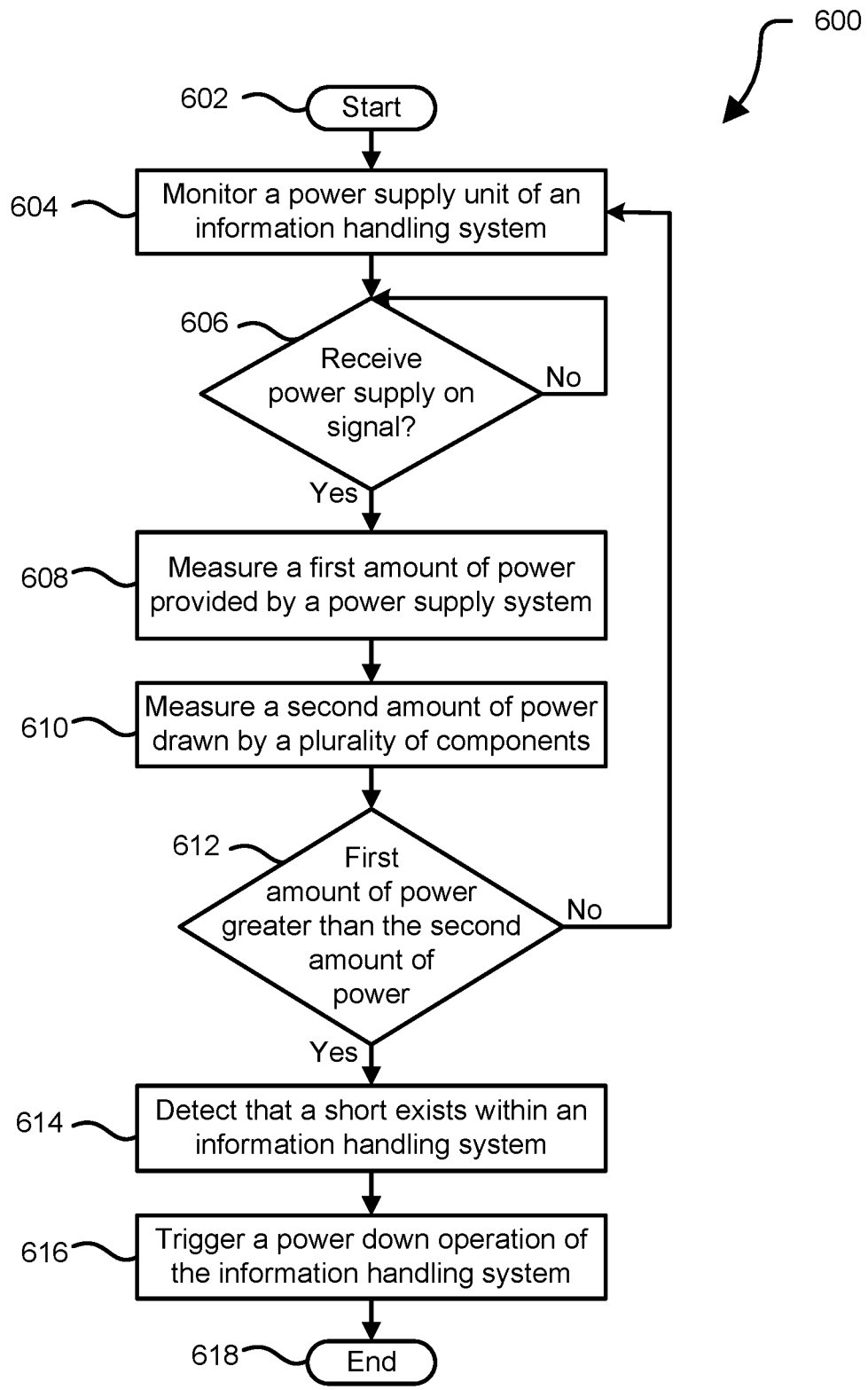
FIG. 6 is a flow diagram illustrating a method for detecting a resistive short within an information handling system according to at least one embodiment of the disclosure.

FIG. 6 is a flow diagram illustrating a method 600 for detecting a resistive short within an information handling system, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, information handling system 200, 300, 400, or 500 described in FIG. 2, 3, 4, or 5, or any other type of system, controller, device, module, processor, or any combination thereof, operable to employ all, or portions of, the method of FIG. 6.

At block 604, a power supply unit of an information handling system is monitored. In certain examples, power supply system 204 may include any suitable device or devices to provide power to the components within information handling system 200 including, but not limited to, multiple power supply units and a hot swap controller. In an example, a device may monitor for a power on signal for the power supply system.

At block 606, a determination is made whether a power on supply signal has been received. In response to the power supply on signal being received, a first amount of power is measured at block 608. In an example, the first amount of power may be the power provided by the power supply system or at the output of a hot swap controller. In certain examples, the first amount of power may be measured by any suitable device in any suitable manner. For example, an IMON may detect a current proportional to a power supply system load. The IMON may output an analog signal representative of the detected power supply system load. In an example, the power supply system may provide a signal directly to resistive short detection circuitry of the information handling system.

At block 610, a second amount of power is measured. In an example, the second amount of power may be an amount of power consumed by one or more components within the information handling system. For example, the second amount of power may be an aggregated amount of consumed power from the multiple devices. In an example, the components may be monitored directly via a digital interface or indirectly via a current monitor device analog interface. In an embodiment, the digital interface is any suitable interface including, but not limited to, an inter-integrated circuit (I2C) protocol interface, platform environment control interface (PECI), and advanced platform management link (APML). At block 612, a determination is made whether the first amount of power is greater than the second amount of power. In an example, a comparator may be utilized to compare the first and second amount of powers. In an example, a digital interface multiplexor and a BMC may be utilized to compare the first and second amount of powers. If the first amount of power is not greater than the second amount of power, the flow continues as disclosed above at block 604. If the first amount of power is greater than the second amount of power, a resistive short is detected within the information handling system at block 614. In an example, a resistive short may cause hardware damage, possible smoke or fire within the information handling system. A power down operation of the information handling system is triggered at block 616, and the method ends at block 618.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a power supply system;
a plurality of components to receive power from the power supply system;
a current monitor to measure a respective amount of current flowing through each respective resistor of a plurality of resistors, wherein each different resistor is associated with a respective different one of the components, based on the measured amount of current flowing through each respective resistor, to determine a total amount of current drawn by the components, and based on the total amount of current drawn, to provide a digital telemetry signal representing a second amount of power drawn by the components; and
resistive short detection circuitry coupled to the power supply system and to the components, the resistive short detection circuitry to:
measure a first amount of power provided by the power supply system;
receive the digital telemetry signal representing the second amount of power drawn by the components;
compare the first amount of power with the second amount of power, wherein the comparison of the first amount of power with the second amount of power includes a margin of difference, wherein the margin of difference accounts for loads that cannot be monitored or sensed accurately; and
in response to first amount of power being greater than a combination of the second amount of power and the margin of difference, determine that a short exists within the information handling system.

2. The information handling system of claim 1, wherein in response to the detection of the short, the device further to trigger a power down operation of the information handling system.

3. The information handling system of claim 1, wherein the resistive short detection circuitry includes:
a comparator to receive a first analog signal associated with the first amount of power, to receive a second analog signal associated with the second amount of power, and to provide an output signal based on a comparison of the first analog signal and a second analog signal.

4. The information handling system of claim 1, wherein the resistive short detection circuitry includes:
a controller to receive a plurality of signals associated with amounts of power drawn by the plurality of components, to receive the first amount of power, and to provide an output signal based on a comparison of the first analog signal and a second analog signal.

5. The information handling system of claim 1, wherein in response to the detection of the short, the device further to provide an alert to a user of the information handling system.

6. The information handling system of claim 1, the device further to receive a power on signal from the power supply system prior to the comparison of the first amount of power and the second amount of power.

7. The information handling system of claim 1, wherein the second amount of power is an aggregation of each amount of power from each of the plurality of components.

8. A method, comprising:
measuring, by resistive short detection circuitry of an information handling system, a first amount of power provided by a power supply system of the information handling system;
measuring a respective amount of current flowing through each respective resistor of a plurality of resistors, wherein each different resistor is associated with a respective different one of the components;
based on the measured amount of current flowing through each respective resistor, determining a total amount of current drawn by the components;
based on the total amount of current drawn, providing a digital telemetry signal representing a second amount of power drawn by the components;
comparing the first amount of power with the second amount of power, wherein the comparing of the first amount of power with the second amount of power includes a margin of difference, wherein the margin of difference accounts for loads that cannot be monitored or sensed accurately; and
if the first amount of power is greater than a combination of the second amount of power and the margin of difference, then identifying that a short exists within the information handling system.

9. The method of claim 8, further comprising:
in response to the detection of the short, triggering, by the device, a power down operation of the information handling system.

10. The method of claim 8, wherein the resistive short detection circuitry includes:
receiving, by a comparator of the resistive short detection circuitry, a first analog signal associated with the first amount of power;

receiving a second analog signal associated with the second amount of power; and providing an output signal based on a comparison of the first analog signal and a second analog signal.

11. The method of claim 8, wherein the resistive short detection circuitry includes:

receiving, by a controller of the resistive short detection circuitry, a plurality of signals associated with amounts of power drawn by the plurality of components;

receiving the first amount of power; and providing an output signal based on a comparison of the first analog signal and a second analog signal.

12. The method of claim 8, further comprising:

in response to the detection of the short, providing, by the device, an alert to a user of the information handling system.

13. The method of claim 8, further comprising:

receiving a power on signal from the power supply system prior to the comparison of the first amount of power and the second amount of power.

14. The method of claim 8, wherein the second amount of power is an aggregation of an amount of power from each of the plurality of components.

15. A method, comprising:

monitoring a power supply system of an information handling system;

receiving a power on signal from the power supply system;

in response to receiving the power on signal, measuring, by resistive short detection circuitry of the information handling system, a first amount of power provided by a power supply system of the information handling system;

measuring a respective amount of current flowing through each respective resistor of a plurality of resistors, wherein each different resistor is associated with a respective different one of the components;

based on the measured amount of current flowing through each respective resistor, determining a total amount of current drawn by the components;

based on the total amount of current drawn, providing a digital telemetry signal representing a second amount of power drawn by the components;

comparing the first amount of power with the second amount of power, wherein the comparing of the first amount of power with the second amount of power includes a margin of difference, wherein the margin of difference accounts for loads that cannot be monitored or sensed accurately; and in response to first amount of power being greater than a combination of the second amount of power, determining that a short exists within the information handling system.

16. The method of claim 15, further comprising:

in response to the detection of the short, triggering, by the device, a power down operation of the information handling system.

17. The method of claim 15, wherein the resistive short detection circuitry includes:

receiving, by a comparator of the resistive short detection circuitry, a first analog signal associated with the first amount of power;

receiving a second analog signal associated with the second amount of power; and providing an output signal based on a comparison of the first analog signal and a second analog signal.

18. The method of claim 17, wherein the output signal is in a first state in response to the first amount of power being greater than the second amount of power, and the output signal is in a second state in response to the second amount of power being greater than the first amount of power.

* * * * *